Sept. 29, 1970  R. J. BRITT  3,530,611
FISHING REEL AND STAND
Filed Dec. 31, 1968  3 Sheets-Sheet 1
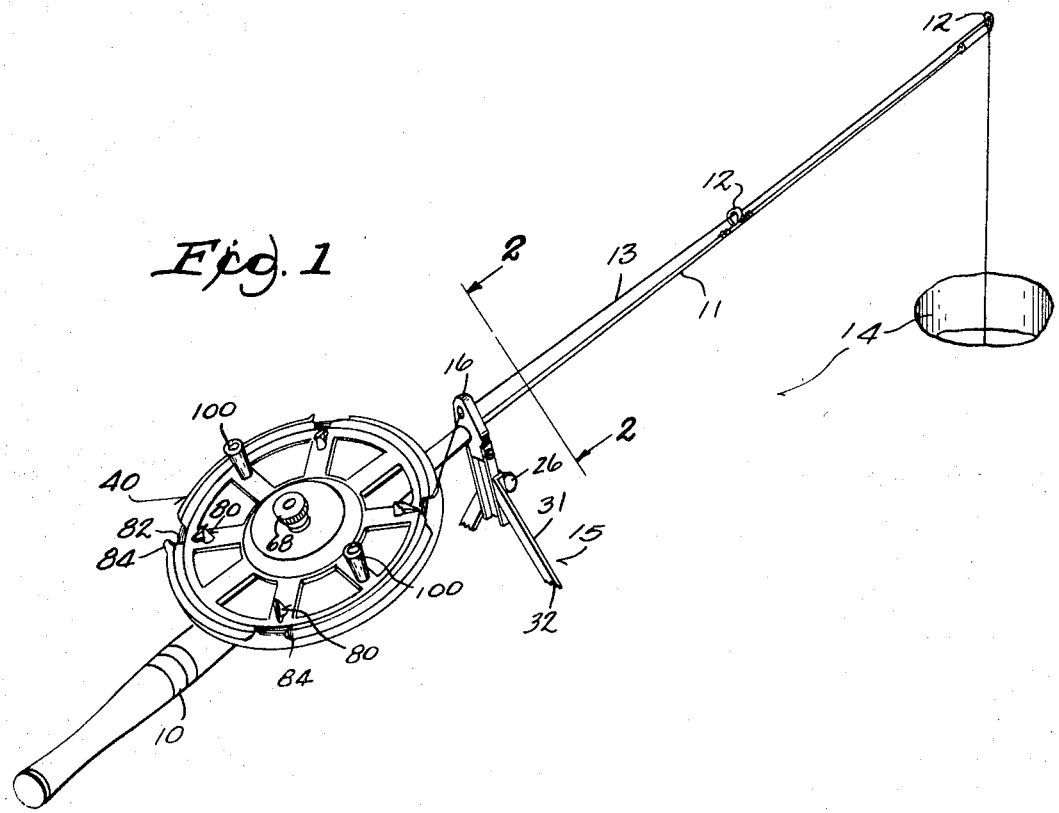
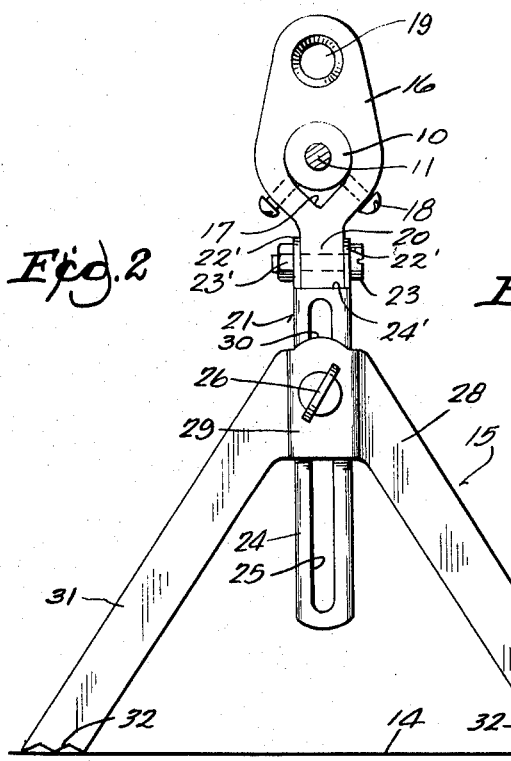
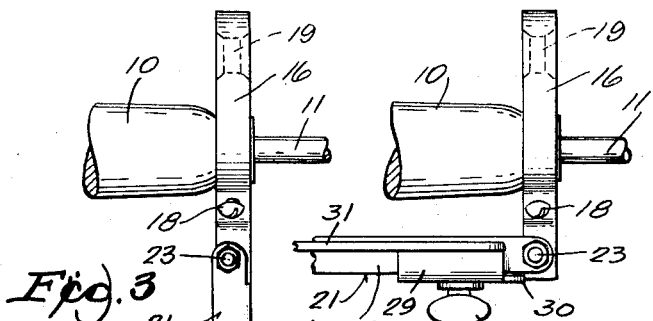
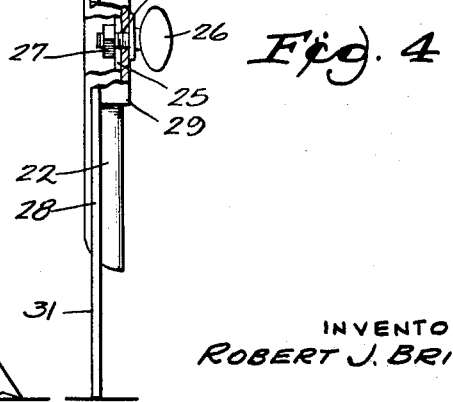
INVENTOR
ROBERT J. BRITT
BY Wheeler, Wheeler, House & Clemency
ATTORNEYS

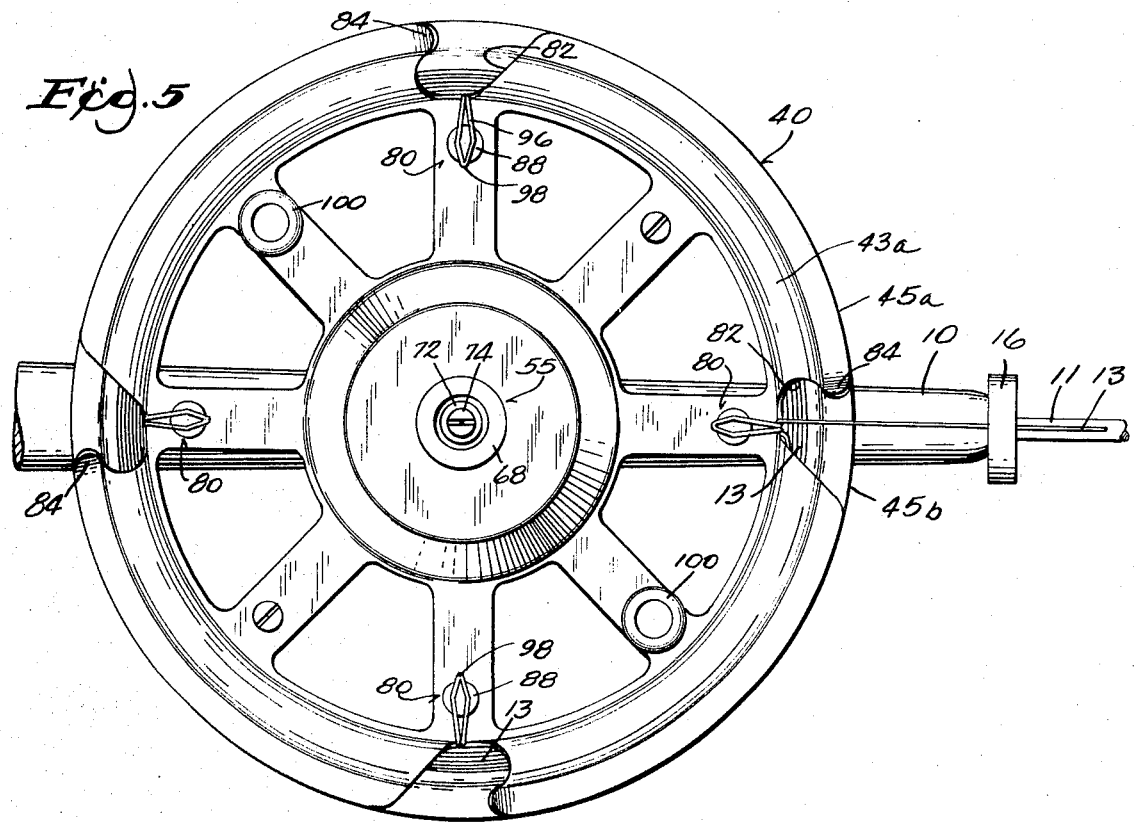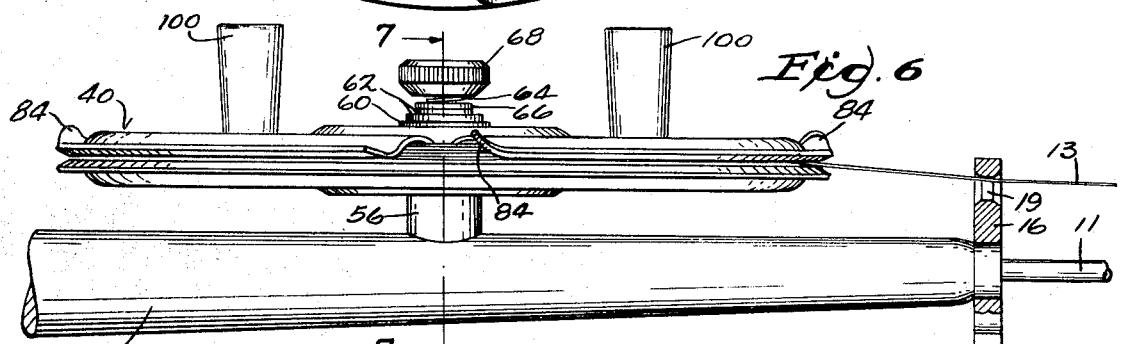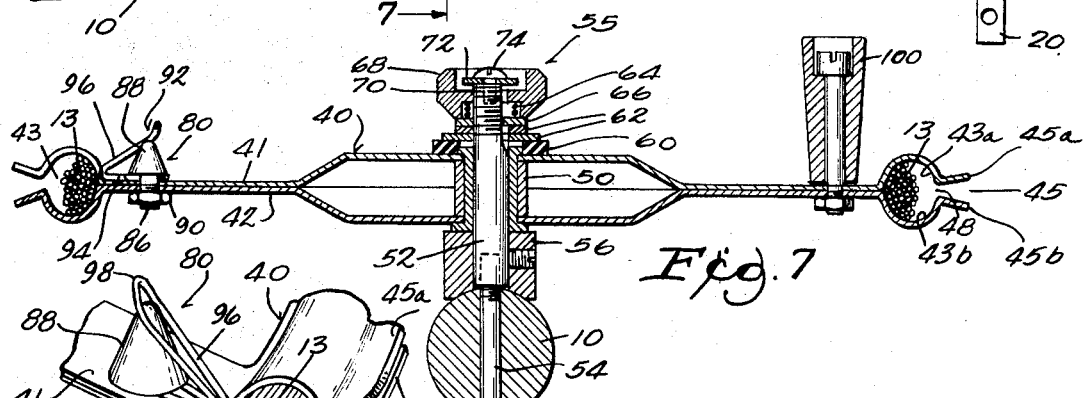

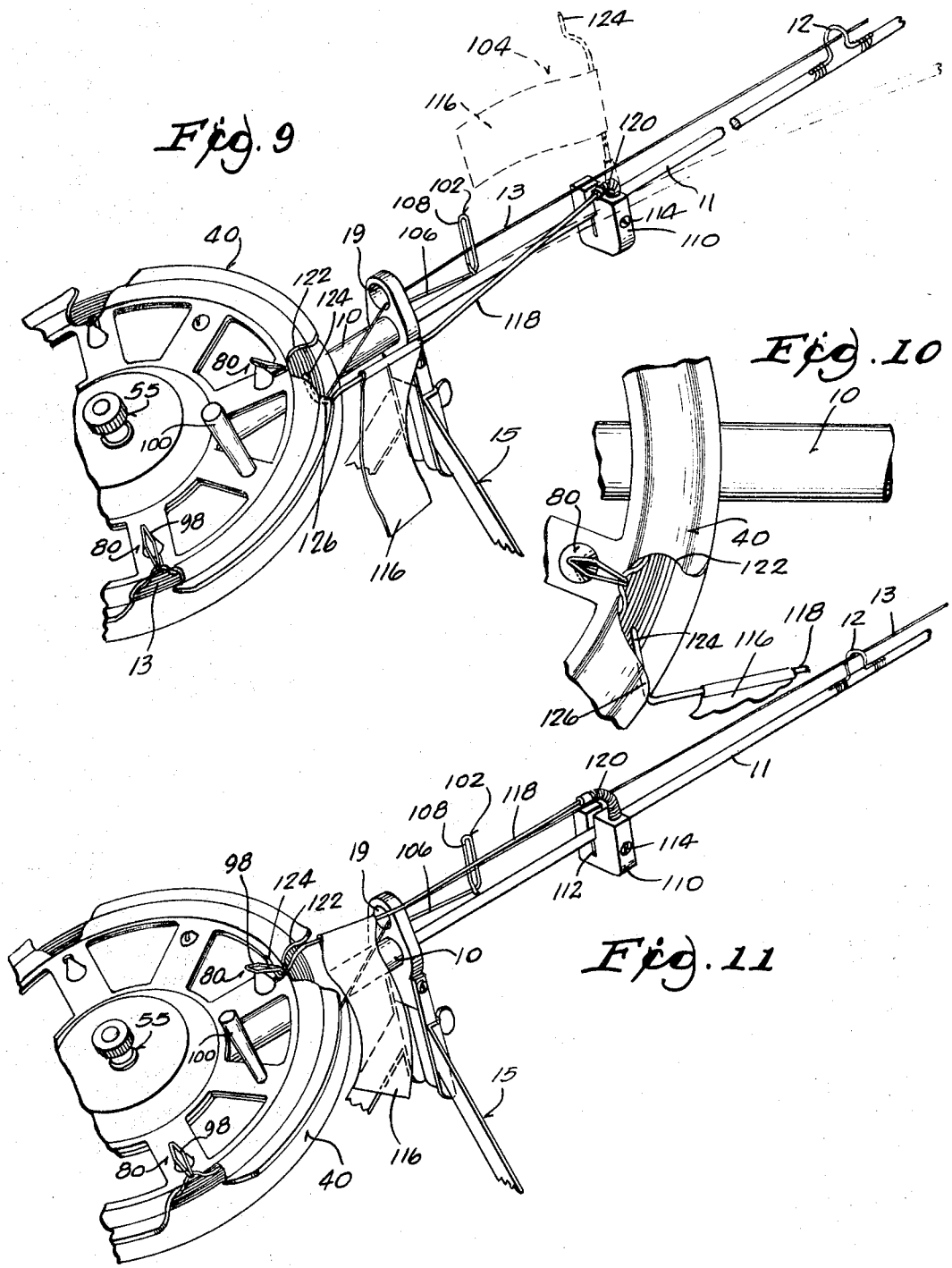

United States Patent Office 3,530,611
Patented Sept. 29, 1970

3,530,611
FISHING REEL AND STAND
Robert J. Britt, Delavan, Wis., assignor to Swiss-Tech, Inc., Delavan, Wis., a corporation of Wisconsin
Continuation-in-part of application Ser. No. 705,763, Feb. 15, 1968. This application Dec. 31, 1968, Ser. No. 798,564
Int. Cl. A01k 89/00, 97/10, 97/12
U.S. Cl. 43—17                                                   15 Claims

ABSTRACT OF THE DISCLOSURE

A fishing pole having a stand located forward of the handle and a large diameter fishing line reel on the upper side of the handle. The stand includes a pair of foldable legs which are openable to form the stand and are adjustable vertically to vary the height of the end of the pole. The reel has an annular line-storage channel or space around its outer periphery and a peripherally-diverging opening or throat, slightly larger than the thickness of the line with the first line guide on the rod located below the peripheral opening in the reel. A number of line-depth stops are secured to the top of the reel with adjacent reliefs or slots cut in the upper part of the peripheral opening to allow setting of the line at different depths.

---

This application is a continuation-in-part of an application, Ser. No. 705,763, filed Feb. 15, 1968, now abandoned.

BACKGROUND OF THE INVENTION

This invention relates to fishing poles of the type used for ice fishing. Many poles have been designed previously for ice fishing and generally have reels of large diameter with the line stored in an annular space around the periphery of the reel as seen in Pat. No. 3,176,929, issued Apr. 6, 1965. Whenever the reel is rotated rapidly, the line tends to spill out of the space due to the high peripheral speed, causing the line to tangle. The tangled line takes time and patience to untangle and wind on the reel and fishing time is lost. This is further objectionable when ice fishing since gloves are normally worn and must be removed if the line is tangled. A line-depth stop may be provided on reels of this type to control the length of line let out each time it is used, but the known type, as in the above patent, provides only a single stop which must be reset each time the depth of the line is changed. The pole is generally propped up on the ice with the end of the pole elevated over the hole in the ice where it can be seen and quickly picked up.

SUMMARY OF THE INVENTION

In my invention a fishing pole is described which can be easily handled and adjusted by a person wearing gloves and is less susceptible to line tangling. A collapsible vertically adjustable stand is provided as a part of the pole and is located in a position to provide a three-point stand in combination with the end of the handle. A disc type reel of large diameter is mounted on the top of the handle and has a number of novel line-depth stops located at positions that will not interfere with the winding or unwinding of the line. The reel is relieved adjacent the stops and has turned-up lips to guide the line back to the line storage channel, which has a novel narrow slot for passage of the line in and out. Even if the line spins off the reel, only one strand at a time can pass through the slot and thereby preventing snarling of the line. Thus, it can be rewound without loss of time while wearing gloves.

The stand is normally folded against the underside of the handle for transporting and storage of the pole and is folded downward to form two points of a three-point stand, the end of the handle forming the third point. A line guide aperture is provided in the stand at a point below the reel so that the line will always ride on the lower part of the reel and will not engage the relieved portions of the top of the reel. The stand, reel and depth stops are all capable of being adjusted by a person wearing gloves.

A novel tip-up type flag is provided on the fishing pole to indicate when a fish is biting. The tip-up can be used with live bait or artificial bait. The motion of the tip up is isolated from the line so that it will not disturb a fish biting on the line. An ice wiper is also provided on the pole to help remove any ice which forms on the line as it is reeled in.

Other objects and advantages will become apparent from the following description when read in connection with the accompanying drawings.

FIG. 1 is a perspective view of the device of my invention as it appears in use.

FIG. 2 is a cross-sectional view on line 2—2 of FIG. 1 showing the supporting stand and line guide portion of my device.

FIG. 3 is a side view of that portion of my device shown in FIG. 2.

FIG. 4 is a view similar to FIG. 3 showing the supporting stand in folded position, with portions broken away.

FIG. 5 is a top view of that portion of my device which includes the reel and supporting stand with the other portions broken away.

FIG. 6 is a side view of that portion of my device shown in FIG. 5.

FIG. 7 is a cross-sectional view on line 7-7 of FIG. 6.

FIG. 8 is a fragmentary enlarged perspective view of a portion of the reel of my device showing the depth-holding stop in detail.

FIG. 9 is a view in perspective of the fishing device with a tip-up and ice wiper attached to the pole section.

FIG. 10 is an enlarged view of a portion of the reel showing the position of the tip-up for artificial bait.

FIG. 11 is a view in perspective of the fishing device showing the position of the tip-up for live baith.

DESCRIPTION OF THE PREFERRED EMBODIMENT

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

The device of my invention comprises a fishing pole having a handle 10 and a flexible pole section 11 provided with line guides 12 which are very large to permit the passage of line 13 even when it is coated with ice. The fishing pole is relatively short and is normally supported on the ice, designated 14, by a stand 15 with the end of the handle 10 resting on the ice and forming the rear leg of a three-leg stand. A large diameter reel 40 is mounted on top of the handle 10.

Stand 15, as best seen in FIG. 2, has an upper body or mounting bracket 16 provided with an orifice 17 to receive the forward end of handle 10. The upper portion of the orifice is curved to matingly engage the upper curve of handle 10 while the lower portion of the orifice is larger to allow for the easy insertion and withdrawal of the handle through the orifice. A pair of set screws 18 is used to secure the handle 10 in the orifice 17. A second orifice 19 is provided near the top of the upper body 16 to serve as the first line guide as best shown in FIG. 1.

Returning to FIGS. 2 through 4, the lower portion of the body 16 has a projection 20 which is embraced by a pair of ears 22′ which are extensions of the two side walls 22 of a channel 21. Bolt 23 and nut 23′, which may be a wing nut, are used to pivotally secure the channel 21 to projection 20. The channel 21 can be folded to a storage position parallel with the handle 10. The pivot axis of bolt 23 is offset from the center of projection 20 (FIG. 3) so that an edge 24′ on the upper end of web 24 on the channel engages the lower end of projection 20 to limit the forward pivotal motion of the channel and positively position the stand in optimum position.

A leg unit 28 is secured to the web 24 of channel 21 by a thumb screw 26 and nut 27 which pass through a slot 25 in the web 24. The nut 27 on the threaded end of thumb screw 26 is in close sliding fit between the side walls 22 of the channel 21 to hold the nut against rotation when screw 26 is tightened to hold leg unit 28 on channel 21. Leg unit 28 is provided with a central section 29 and a pair of legs 31 that diverge outward in a V shape with the apex of the V upward. The central section is complementary to, and slideable on, channel 21 and is provided with a hole 29′ just large enough to receive the threaded portion of thumb screw 26. Thus, when the thumb screw 26 is tightened, the leg portion 28 is locked securely to channel 21 in whatever vertically-adjusted position it occupies. In FIG. 4, the channel 21 is shown pivoted parallel to handle 10. The channel 21 is locked in the parallel position by loosening screw 26 and moving the leg unit 28 into engagement with the lower portion 20 of the body 16 and retightening the thumb screw. A flange 30 on central portion 29 of leg unit 28 will bear against the side of lower portion 20 of the body 16 and lock the stand in its folded position. The lower ends of the legs 31 are each provided with serrations 32 to provide a slip-proof grip on ice 14.

The reel 40, as best seen in FIGS. 5 through 8, includes upper and lower spoked plates 41 and 42, each provided with an annular groove 43a and 43b, respectively, near the periphery to form an annular line cavity 43. The outer edge 45a and 45b of each of the plates is bent outward to form a diverging throat 45 with a small gap 48 extending around the outer side of the line cavity 43. The gap 48 should be only slightly larger than the thickness of the line wound on the reel so that only a single strand of line can come out of the cavity when it rotates. Handles 100 are provided on the reel to aid in winding the line onto the reel.

The plates are secured together to form the reel 40 and are mounted to rotate on a post 52 that is secured to the handle 10 by a screw 54. A bushing 50 is centrally positioned between plates 41 and 42 positioned on the post and rests on a spacer 56 above the handle. A brake 55 is provided at the upper end of the post 52 and includes a rubber washer 60 and a pair of fiber rings 62 mounted on the upper end of the post. A washer 66 is keyed on the bolt above the upper fiber ring 62 and a spring 64 is placed on top of the washer. A knurled nut 68 is screwed onto the threaded portion 70 of the post. By tightening or loosening of the nut, the bias of the spring 64 can be increased or decreased to produce the desired braking effect. If the nut 68 is screwed down tight against washer 66, the reel 40 will be locked in position. A lock washer 72 and a screw 74 may be secured to the top of the post to prevent the nut 68 from unscrewing too far and coming off of the top of the bolt.

A number of line-depth stops or keepers 80 are provided on the top plate 41 to enable the user to set the line at a number of different lengths. A slot 82 is cut into the edge of the top plate 41 opposite each depth stop 80 with the lip 84 of each slot bent upward to serve as a line guide to replace the line in cavity 43 as the reel 40 rotates and prevent the line from overlapping the top plate. (The reel is rotated clockwise as shown in FIG. 5 when the line is wound into the reel.) The line guide 19 in the edge of the top of the stand is located below the edge 45 of the bottom plate 42 (FIG. 6) to prevent the line from catching on slots 82 of the top plate 41 by holding the line 13 against the smooth edge 45b. This also tends to remove the ice from the line.

Each line depth-stop 80 includes a bolt 86 having a conical head 88 mounted on the plates and held in position by nut 90. A wire 92 is bent to form a double V-shaped finger with one leg 94 of each side wrapped around the bolt 86 under the conical head 88 and the other leg 96 of each side straddling the rounded apex of the conical head 88. The free end of the finger is the loop 98 of the wire 92. The leg 96 of the wire forms a resilient finger straddling the apex of head 88 and is sufficiently flexible to allow the fishing line, when pulled against the upper free end of the wire, to bend the wire upward allowing the line to pass over the top of the conical head 88 and slide under the wire. The same line can also be removed from the line-depth stop by merely pulling the line upward against leg 96 until it clears the apex of the conical head 88. Other forms of protuberances from reel 40 may replace head 88, and other forms of fingers may replace wire 92. When using line-depth stops as described herein the line can be quickly and easily set in the line-depth stop by a man wearing heavy gloves. The outer circumference of the reel is eighteen inches so the line can be set at a number of known depths by merely counting the revolutions of the reel as the line is unwound and setting the line in one of the depth stops. When the line is released, the weight at the end of the line pulls it straight on a line from the depth stop through slot 82 to line guide 19 below gap 48 so that the line bears only on smooth lower reel plate 42. Lip 84 ensures that when the reel is turned the line enters gap 48 and winds into annular space 43.

Referring to FIGS. 9, 10 and 11, a modified fishing device is shown which includes means for wiping and removing ice from the line 13 comprising an ice wiper 102 and means for signaling a bite on the line comprising a tip-up 104. The ice wiper 102 includes a wire 106 having one end secured to the bracket 16 and extending generally longitudinally along the pole 11 with the other end of the wire 106 bent to form an elongate loop 108 for the line 13 and extending radially outwardly from the pole 11. The gap in the loop 108 is made larger than the line 13 to allow for the free movement of the line through the loop 108 but small enough to dislodge any ice that may accumulate on the line. The loop 108 is twisted slightly so that the line 13 engages both sides of the loop 108 as it passes through the loop. Any ice that accumulates on the line 13 will be knocked off the line on engagement with the loop 108. If the pole is used where a large amount of ice is expected, the line gap 48 in the reel 40 should be increased to the same size as the gap in the loop 108 of the ice wiper 102. A gap of $7/16$ inch has been found effective.

The tip-up 104 can be used with both of the devices shown in the drawings. The tip-up 104 includes a rod 118 connected to a mounting block 110 by means of a coil spring 120 with a flag 116 secured to the rod 118. Means is provided to releasably secure the block 110 to the pole 11. This means includes a screw 114 on the side of the block which is tightened to close a slot 112 in the mounting block 110 on the rod 11. The block 110 is formed from a material which is sufficiently resilient to allow for a small amount of movement when the screw 114 is turned to squeeze the rod 11 in the slot 112. The block 110 is positioned on the rod 11 a distance from the reel 40 sufficient for the end of the rod 118 to be releasably attached to the reel 40. The coil spring 120 allows the rod 118 to be bent downward and provides a return force when the rod 118 is released from the reel and the flag 116 raised to provide the signal.

Means is provided to releasably attach the end of the rod 118 to the reel 40 comprising an arcuate portion 122 and a transversely-extending section 124 provided at the end of the rod 118. The transversely-extending section 124 is positioned under the lip 126 of the reel 40 or under one of the line-depth gauges 80, depending on the type of bait being used. When artificial bait is used, the motion of the pole 11 is used to release the section 124 from the lip 126. This can be seen in FIGS. 9 and 10 where the reel 40 has been turned so that section 124 is partially positioned under lip 126 and is locked from rotation by brake 55. Any downward movement of the end of the rod 11 will pull the section 124 of the tip-up 104 out from under the lip 126 allowing the coil spring 120 to raise the rod and wave the flag 116.

When live bait is used, the tip-up 104 is firmly secured in the down position by inserting section 124 of the rod 118 under spring 98 on one of the depth-gauge stops 80. When a fish pulls on the line 13, the reel 40 will rotate moving the spring 98 away from section 124 and releasing the tip-up. The fishing pole is set up for live bait by allowing the line to run out to the depth set on the depth stop 80 and then rotating the reel back 90°. Section 124 is inserted under the spring 98 on the preceding depth stop 80 (see FIG. 11). The reel 40 is then free to rotate 90° before the set depth stop 80 is rotated into line with the rod 11 preventing further movement of the reel.

The setting procedures described are not limited to the particular bait type, but may be used at the discretion of the user. The first setting procedure is extremely sensitive, while the second requires that a small amount of line to be taken out by the fish before the signal is given.

What is claimed is:

1. A fishing pole having a handle at one end, and a reel rotatably secured to the handle, said reel having an annular line cavity around its outer perimeter, said line cavity having an outwardly diverging throat with the narrowest part of the throat forming a line gap around the outer circumference of said line cavity, a stand secured to the handle, said stand including a pair of legs which are foldable to a position parallel to the handle, wherein said stand includes a body portion and a channel pivotally mounted on the body portion for movement to a position parallel to the handle, said legs being moveably mounted on said channel and including a flange to engage the body portion and lock the channel in the parallel position.

2. A pole according to claim 1 wherein said line gap has a width slightly greater than the line.

3. A pole according to claim 1 wherein a line guide is provided on the pole below the level of the gap in the line cavity.

4. A pole according to claim 1 including means for wiping the line to remove ice as the line is wound onto the reel.

5. A pole according to claim 4 wherein said line wiping means comprises a vertically elongate wire loop having a gap larger than the line, said gap being at such an angle to the line as to touch the line at both sides of said loop.

6. A fishing pole having a handle at one end, and a reel rotatably secured to the handle, said reel having an annular line cavity around its outer perimeter, said line cavity having an outwardly diverging throat with the narrowest part of the throat forming a line gap around the outer circumference of said line cavity, including a number of line depth stops mounted on said reel and a corresponding number of slots in said cavity in the reel adjacent the line depth stops, a stand mounted on said handle and having a body portion and a channel pivotally mounted on said body portion and a pair of legs in the form of a V adjustably mounted on said channel.

7. A fishing pole according to claim 6 wherein said legs are moveably mounted on said channel and include a flange located in a position to engage the body portion of the stand to lock the stand in a folded position.

8. A pole according to claim 1 including means for signaling a bite.

9. A fishing pole according to claim 8 wherein said signaling means includes a flexible rod mounted on said pole and a flag secured to said rod, said rod being retained in a down position by said reel and released by the motion of said pole.

10. A pole according to claim 6 including a tip up mounted on said pole, said tip-up including means capable of engagement with said depth stops and with said reel.

11. In a fishing pole, the subcombination comprising a reel mounted for rotation respecting said pole and having a portion on which line is wound, and at least one depth stop on said reel comprising a finger having a free end directed axially from the part on which line is wound and a portion adapted to hold a loop of line passed over said free end.

12. A depth stop according to claim 11 wherein said finger is resilient.

13. A depth stop according to claim 11 wherein said reel has a protuberance extending into close proximity to said free end of said finger.

14. A depth stop according to claim 13 wherein said finger comprises a loop including a pair of generally parallel resilient members respectively passing on opposite sides of the apex of said protuberance.

15. A depth stop according to claim 13 wherein said protuberance is generally conical with a rounded apex and said finger comprises a resilient wire having a loop comprising the free end, and generally parallel sides extending past respective sides of the apex of said protuberance.

References Cited

UNITED STATES PATENTS

| | | | |
|---|---|---|---|
| 2,514,929 | 7/1950 | Brandt | 43—25 X |
| 2,624,972 | 1/1953 | Burg | 43—17 |
| 2,650,052 | 8/1953 | Bintz | 43—21.2 X |
| 2,680,925 | 6/1954 | Grunwald et al. | 43—25 |
| 2,698,725 | 1/1955 | Triplett | 43—21.2 X |
| 2,772,505 | 12/1956 | Kaiser | 43—20 |
| 3,034,246 | 5/1962 | Davidson | 43—17 |

FOREIGN PATENTS

| | | |
|---|---|---|
| 730,975 | 6/1955 | Great Britain. |
| 774,634 | 5/1957 | Great Britain. |

SAMUEL KOREN, Primary Examiner

D. J. LEACH, Assistant Examiner

U.S. Cl. X.R.

43—20, 21.2, 25; 242—84.1; 248—46